United States Patent
Kawashima et al.

[11] 4,057,324
[45] Nov. 8, 1977

[54] METHOD OF MAKING A TRANSPARENT FERROELECTRIC CERAMIC ELEMENT

[75] Inventors: Syunichiro Kawashima, Amagasaki; Masamitsu Nishida, Osaka; Yoshihiro Matsuo, Neyagawa; Hiromu Ouchi, Toyonaka; Shigeru Hayakawa, Hirakata, all of Japan

[73] Assignee: Matsushita Electric Industrial Co., Ltd., Japan

[21] Appl. No.: 612,744

[22] Filed: Sept. 12, 1975

[30] Foreign Application Priority Data

Sept. 12, 1974 Japan .................... 49-105695

[51] Int. Cl.$^2$ .................... C04B 35/64
[52] U.S. Cl. .................... 350/150; 264/140; 264/332
[58] Field of Search .................... 264/61, 332, 140; 350/150

[56] References Cited
PUBLICATIONS

Haertling et al., "Hat Pressed (Pb,La) (Zr,Ti)O$_3$ Ferroelectric Ceramics for Electrooptic Applications", *J. Am. Cer. Soc.*, vol. 54, No. 1, Jan. 1971, pp. 1–11.

Bickford et al., "Ferroelectric Ceramics", *Cer. Ind.*, vol. 66, No. 3, pp. 79–80 Mar. 1956.

Backner et al., "Effects of Calcining on Sintering of Lead Zirconate-Titanate Ceramics," *Cer. Bull.*, vol. 51, No. 3, pp. 218–222 (1972).

*Primary Examiner* — Robert F. White
*Assistant Examiner* — John Parrish
*Attorney, Agent, or Firm* — Wenderoth, Lind & Ponack

[57] ABSTRACT

A method of making an electrooptical system including a transparent ferroelectric ceramic element which possesses memory in that a birefringence corresponding to an applied electric field remains after the field is removed. The electrooptical element is hot-pressed from a family of materials which comprises solid solution of the ternary system, lead magnesium niobate-lead titanate-lead zirconate, and the hot-pressed material may additionally contain a small amount of lanthanum oxide (La$_2$O$_3$).

3 Claims, 3 Drawing Figures

○ POCKELS CONSTANT
● KERR CONSTANT

METHOD OF MAKING A TRANSPARENT FERROELECTRIC CERAMIC ELEMENT

This invention relates to a hot-pressed, transparent, ferroelectric ceramic compositions useful for fabricating polarization changing elements for electro-optical systems.

Electro-optical systems are well known and are described for example, in U.S. Pat. No. 3,069,973 to I. Ames. Such systems utilize variations in an electric field applied across a transparent active element to produce variations in the refractive index of the element in order to modulate the intensity of polarized light passing through the device. The systems comprise a controllable birefringent element located between two polarizers having their planes of polarization at right angles to one another. The light input passes through the first polarizer and enters the element as plane polarized light. In the absence of an electrical field across the active element, the plane polarized light passes through the element without rotation and is totally absorbed by the second polarizer. However, when an electrical field is applied to the element, the element becomes birefringent, and the light emerges from the element as eliptically or circularly polarized light, part of which passes through the second polarizer, or analyzer. An output device, such as a photomultiplier is disposed at the side of the analyzer remote from the active element and provides the output of the system.

Most prior art electro-optical systems have employed as their active elements monocrystalline forms of various ferroelectric materials. Although single crystals were expensive and could not be grown in sufficiently large sizes the continued use thereof resulted from the belief that satisfactory polycrystalline materials free from deleterious surface effects due to grain boundaries and porosity and of sufficient transparency to provide electrooptic effects could not be produced.

Wafers of transparent, hot-pressed ferroelectric polycrystalline material have recently been made by first preparing a polycrystalline composition in powder form by solid state reaction of the proper ingredients and then hot-pressing the resultant powders while applying pressure thereto. A description of these materials and a method of forming them are found in the publication "Hot-Pressed Ferroelectric Lead Zirconate Titanate Ceramics for Electro-Optical Applications" by G. H. Haertling, The American Ceramic Society Bulletin, vol. 49, No. 6, June 7, 1970, pp. 564–567. The base system of lead zirconate titanate is not transparent per se but can be made transparent by the addition of small amounts of bismuth oxide or lanthanum oxide.

Lead zirconate titanate ceramics are required to have excess PbO added thereto when starting materials are combined to be highly transparent. Said excess PbO gets vaporized during hot-pressing. Vaporized PbO solidifies $ZrO_2$ or $Al_2O_3$ powder spacer surrounding the hot-pressed transparent ceramics and spoil $Al_2O_3$ die which is used for hot-pressing.

Therefore, and object of this invention is to provide an improved transparent ferroelectric ceramic composition and an electrooptic element mode threfrom.

Another object of this invention is to provide a high transparent ferroelectric ceramic composition which may be prepared without a large amount of PbO to be vaporized during hot-pressing.

This invention will be described in detail with the aid of the accompanying drawings, in which.

Figure 1:
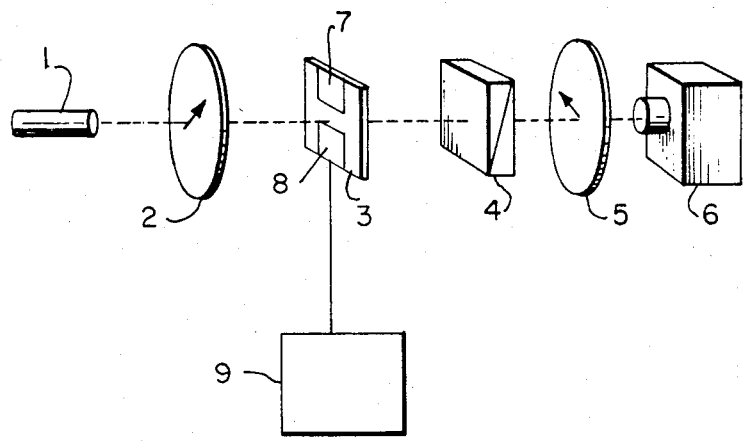
FIG. 1 is a schematic representation of the ellipsometer which is used to measure Kerr Constant and Pockels Constant of a hot-pressed transparent ferroelectric ceramic material to which this invention relates.

Referring to FIG. 1, a light source 1, a He—Ne Gas laser with an output of 6328A, directs a light beam to a polarizer 2. After passing through polarizer 2, the light enters a wafer-shaped active element 3 which may be made from the hot-pressed transparent ferroelectric ceramic material made by the method to which this invention relates.

A variable D.C. voltage is applied between electrodes 7 and 8 provided at opposing edges on one major surface of the element 3 by a D.C. supply source 9 in a direction perpendicular to the direction of the light beam path, as shown. Thereby, a required electric field is applied to the element 3. The light beam, after passing through element, is compensated by a compensator 4. An analyzer 5 has its plane of polarization perpendicular to that of the polarizer 2. The electric field resulting from the voltage applied to electrodes 7 and 8 may be applied at an angle of 45° with respect to the planes of polarization of polarizer 2 and analyzer 5. Light passing through analyzer 5 is detected by a photomultiplier 6, the output of which may be connected to an amplifier (not shown).

The compositions of the hot-pressed transparent ferroelectric ceramic material to be used in this invention are represented by the following formula:

$$Pb_{1-(3/2)t}La_t(Mg_{1/3}Nb_{2/3})_xZr_yTi_zO_3 + \alpha PbO$$

where
- $t = 0.04$–$0.15$
- $x = 0.03$–$0.60$
- $y = 0.10$–$0.95$
- $z = 0.05$–$0.90$
- $x + y + z = 1$
- $\alpha = 0.00$–$0.20$ The transparent ferroelectric electrooptic composition used in this invention may be made by mixing PbO, $MgCO_3$, $TiO_2$, $ZrO_2$, $Nb_2O_5$ and $La_2O_3$ in appropriate proportions to form one of the compositions represented by said formula. This mixture is calcined, the material is ground and then hot-pressed at a temperature between 900° C and 1300° C for at least 1 hour. At hot-pressing temperatures below about 900° C, transparent elements cannot be obtained, and temperatures above 1300° C cause deterioration in properties (e.g. decrease of transparency and breakdown voltage) due to volatilization of PbO.

When a period of time of hot-pressing is shorter than 1 hour, transparent ceramics cannot be obtained. At the pressure of hot-pressing lower than 1000 p.s.i, transparent ceramics cannot be obtained, either. In the region $t<0.04$, obtained ceramics are not sufficiently transparent for applications. In the region $t<0.15$, obtained ceramics become opaque and no electrooptical effect can be observed. When $y<0.1$ or $y>0.95$ or $z<0.05$ or $z>0.90$, electrooptical effect is hardly observed.

The transparent ferroelectric electrooptical composition of this invention may be made by mixing said oxides in the proportions of the composition represented by said formula. But it is assumed that PbO becomes vaporized during hot-pressing and the composition of the resultant transparent ceramics is considered to be represented by said formula where $\alpha \approx 0$. Chemical quantum analysis of the resultant transparent ceramics proved this assumption. So the compound mixed in proportion in accordance with the formula usually employed for $Pb_{1-x}La_x(Zr_yTi_z)_{1-i}O_3$ (PLZT) comprises excess PbO. But excess PbO is needed to enhance transparency. In PLZT, 8-10 mole % excess PbO is needed. Excess PbO is vaporized during hot-pressing. Besides, usually in the hot-pressing, an $Al_2O_3$ die and pins are used. And, the space between the die and the compact which is hot-pressed is filled with $ZrO_2$ powder or $Al_2O_3$ powder as a spacer. Transparent ceramics are hot-pressed in a die made of $Al_2O_3$.

Vaporized PbO reacts with $Al_2O_3$ and deteriorates the $Al_2O_3$ strength. Thus, the vapor PbO is harmful to the die. And, the PbO vapor reacts with $ZrO_2$ powder or $Al_2O_3$ powder spacer which fills the space between the pellet of the transparent ceramics and the die, and solidifies the $ZrO_2$ powder and $Al_2O_3$, and makes it difficult to take out the hot-pressed transparent ceramics from the die. Thus, it is desirable that the amount of the vaporized PbO be small.

Figure 2:
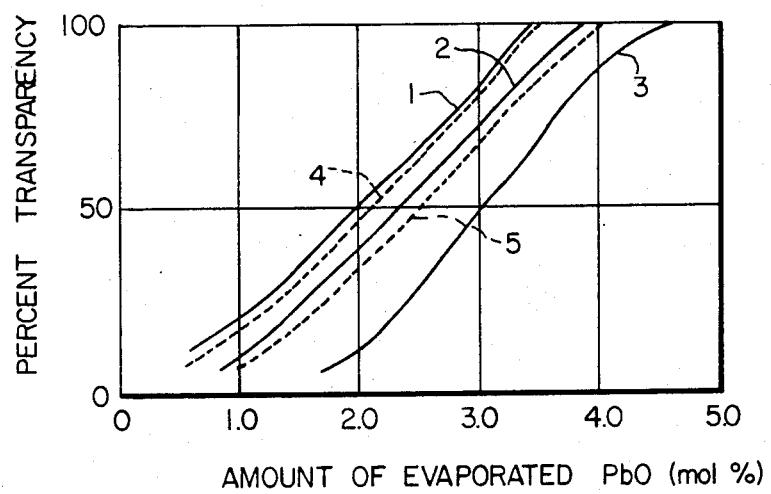
FIG. 2 is a graph showing relation between percent transparency and amount of vaporized PbO.

In FIG. 2, the percent transparency of samples (transparent ferroelectric ceramic elements) each in thickness of 40 mils for the light wavelength of 6328A at the various amounts of vaporized PbO is shown. It is difficult to measure the weight of vaporized PbO directly. Thus, the amount of vaporized PbO is estimated from $\alpha$, which may show the amount of excess PbO. Therefore, each value of amount of vaproized PbO in FIG. 2 is not a precise value of amount of PbO actually vaporized but is not much different from the precise value.

In FIG. 2, both the solid and broken lines correspond to the compounds prepared in accordance with the formula

$$Pb_{1-(3/2)t}La_t(Mg_1Nb_1)_xTi_yZr_zO_3$$

at various value of $t$, $x$, $y$ and $z$.

The solid line 1 corresponds to the transparency at $t=0.08$, $x=0.10$, $y=0.58$ and $z=0.32$; the solid line 2 at $t=0.08$, $x=0.40$, $y=0.46$ and $z=0.24$; the broken line 4 at $t=0.08$, $x=0.10$, $y=0.36$ and $z=0.54$; the broken line 5 at $t=0.08$, $x=0.40$, $y=0.21$ and $z=0.39$; and the solid line 3 corresponds to the transparency of PLZT at various amounts of excess PbO.

These show that 3.5 mol % or more amount of vaporized PbO is needed to obtain highly transparent ceramics. In PLZT, at least 5.0 mol % is needed. In the electrooptical ceramics made by this invention, smaller amount of vaporized PbO is needed than in the case of PLZT, to obtain highly transparent ceramics.

Figure 3:
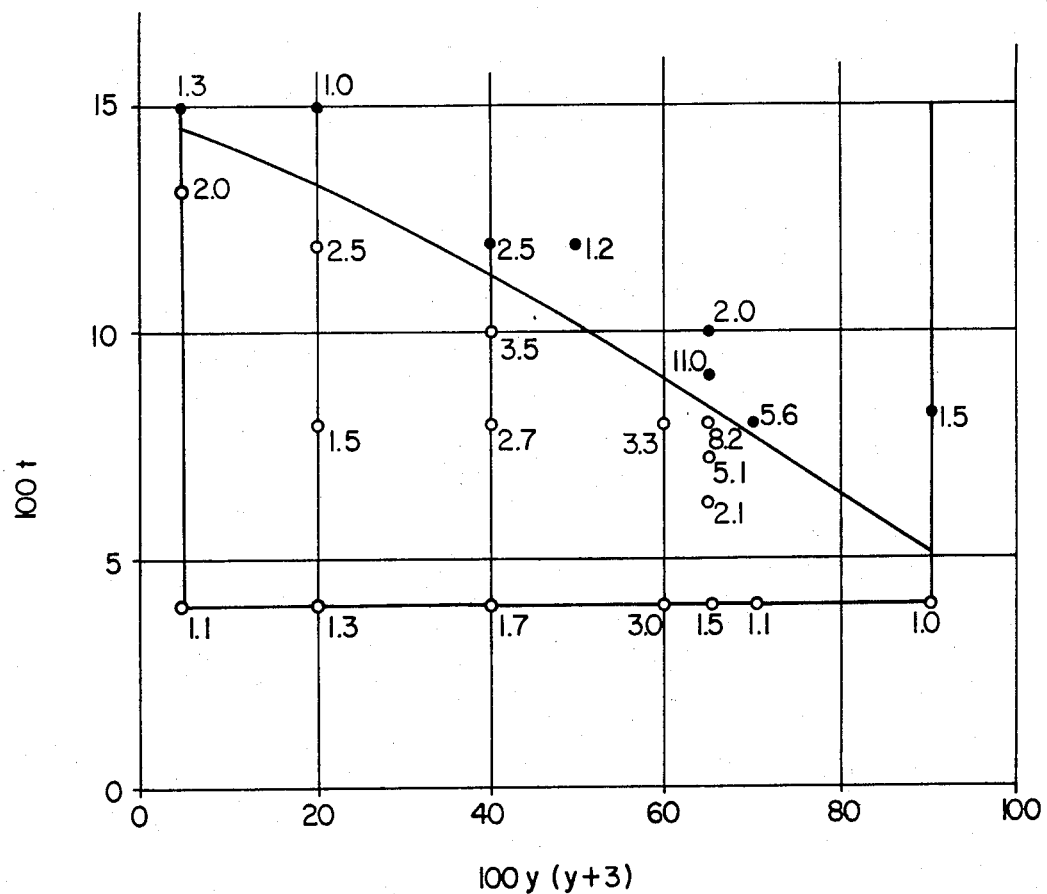
FIG. 3 is a graph showing ranges of the transparent ferroelectric ceramic composition showing Kerr effect and Pockels effect.

In FIG. 3, values of Kerr constant and Pockels constant of compositions, i.e. at various values of $t$ and $y$ and $x$ is fixed to 0.10 are shown. The transparency is not sufficient at value of $100y/(y+3)$ smaller than 0.05 or larger than 0.90, and at value of $100t$ smaller than 0.04 or larger than 0.15.

The transparent ceramics which have the compositions in upper region of the rectangle exhibit the Kerr effect and those in lower region exhibit the Pockels effect, as shown.

In Table I, Kerr constant and Pockels constant of the transparent ceramics at the various compositions in this invention are exhibited. These transparent ceramics have high transparency and have a large Pockels constant (larger than $1.0 \times 10^{16} m^2/V^2$) or a large Kerr constant (larger than $1.0 \times 10^{10} m/V$). These materials are thus useful for electrooptical applications.

EXAMPLE 200 grams of a compound corresponding to a batch formula

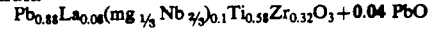

$$Pb_{0.88}La_{0.08}(Mg_{1/3}Nb_{2/3})_{0.1}Ti_{0.58}Zr_{0.32}O_3 + 0.04\ PbO$$

was prepared by mixing PbO, $MgCO_3$, $Nb_2O_5$, $TiO_2$ and $ZrO_2$. This mixture was ground with pure water by using a pot mill for 24 hours and then dried and compacted into a disc and calcined in air at 850° C for 12 hours.

The thus obtained disc was then reground in pure water for 12 hours and dried to obtain a powder. The resultant powder was pressed into a disc of 1.0 inch in diameter and 0.8 inch in thickness, and placed in a die of $Al_2O_3$ of 1.2 inches in inner diameter and 2.5 inches long. The space between the disc and the die was filled with 60 mesh $ZrO_2$ powder (60 mesh: particles of about 100 microns diameter or less pass therethrough) prefired at a temperature higher than 1800° C. And then the disc was hot-pressed in oxygen atmosphere at 1200° C and 3000 p.s.i. for 6 hours. The hot-pressed disc was sliced and polished to 40 mils and 4 mils thickness. And then, the former was annealed at 800° C for 2 hours to eliminate the stress during hot-pressing and polishing. Then transparency was measured with a 6328A gas laser as a light source and a photomuliplier as a detector. And, gold electrodes were evaporated on oppositing edges of one surface of the latter (i.e. sample of 4 mils in thickness) as shown by reference numerals 7, 8 and 3 of FIG. 1 and mounted in the apparatus as illustrated in FIG. 1.

Birefringences at various values of applied voltages were measured. From the measured birefringence, electrooptical effect constant, i.e. the Pockels constant or Kerr constant, was calculated.

This element had a Pockels constant of $3.1 \times 10^{10}$ m/V. Percent transparency for the 6328A gas laser was about 100 %, as shown in FIG. 2, assuming that about 15 % of amount of the light directed onto the element was reflected at the surface of the element (sample).

Other samples shown in Table 1 were prepared in the same manner and their properties were measured in the same manner as above.

It is to be noted that according to the method of this invention, the powders could be easily hot-pressed to become highly transparent with a small amount of PbO vaporized during the hot-pressing.

Table 1

| Sample No. | t | x | y | z | Pockels constant $\times 10^{10}$(m/V) | Kerr constant $\times 10^{16}$(m$^2$/V$^2$) |
|---|---|---|---|---|---|---|
| 1 | 5 | 0.20 | 0.48 | 0.32 | 1.1 | — |
| 2 | 6 | 0.20 | 0.52 | 0.28 | 6.5 | — |
| 3 | 5 | 0.20 | 0.64 | 0.16 | — | 3.2 |
| 4 | 7 | 0.20 | 0.56 | 0.24 | 2.0 | — |
| 5 | 7 | 0.20 | 0.52 | 0.28 | — | 5.5 |
| 6 | 9 | 0.20 | 0.16 | 0.64 | 1.6 | — |
| 7 | 9 | 0.20 | 0.52 | 0.28 | — | 1.2 |
| 8 | 10 | 0.20 | 0.32 | 0.48 | — | 3.2 |
| 9 | 12 | 0.20 | 0.16 | 0.64 | — | 2.5 |
| 10 | 5 | 0.40 | 0.08 | 0.52 | 1.1 | — |
| 11 | 5 | 0.40 | 0.16 | 0.44 | 2.3 | — |
| 12 | 5 | 0.40 | 0.24 | 0.36 | — | 3.0 |
| 13 | 7 | 0.40 | 0.08 | 0.52 | — | 2.0 |
| 14 | 7 | 0.40 | 0.16 | 0.44 | — | 1.4 |
| 15 | 4 | 0.60 | 0.08 | 0.32 | — | 1.1 |
| 16 | 6 | 0.60 | 0.08 | 0.32 | — | 2.5 |

Table 1-continued

| Sample No. | t | x | y | z | Pockels constant $\times 10^{10}$ (m/V) | Kerr constant $\times 10^{16}$ (m$^2$/V$^2$) |
|---|---|---|---|---|---|---|
| 17 | 4 | 0.60 | 0.16 | 0.24 | — | 1.9 |

What is claimed is:

1. A method of making a transparent ferroelectric ceramic element, comprising the steps of:

forming a solid solution of a material of the formula

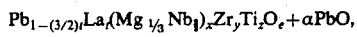

$$Pb_{1-(3/2)t}La_t(Mg_{1/3}Nb_1)_xZr_yTi_zO_e + \alpha PbO,$$

where $t = 0.04$–$0.15$, $x = 0.03$–$0.60$, $y = 0.10$–$0.95$, $z = 0.05$–$0.90$, $x+y+z = 1$, and $\alpha = 0.00$–$0.20$;

grinding said solid solution to form a ferroelectric powder; and hot-pressing said powder at a temperature between 900° C and 1300° C and at a pressure of at least 1000 p.s.i. for a period of time which is sufficient to form a transparent ferroelectric ceramic element.

2. A method in accordance with claim 1, wherein the step of hot-pressing is performed for a period of time of at least 1 hour.

3. The transparent ferroelectric ceramic element made by the method of claim 1.

* * * * *